United States Patent [19]

Couetoux

[11] Patent Number: 5,371,445
[45] Date of Patent: Dec. 6, 1994

[54] SWITCHING DEVICE FOR CONTROLLING TWO ELECTRIC MOTORS AT DIFFERENT SPEEDS

[75] Inventor: Hervé Couetoux, Versailles, France

[73] Assignee: Valeo Thermique Moteur, Le Mesnil-Saint-Denis, France

[21] Appl. No.: 89,077

[22] Filed: Jul. 8, 1993

[30] Foreign Application Priority Data

Jul. 9, 1992 [FR] France ................. 92 08542

[51] Int. Cl.⁵ ............................... H02P 1/54
[52] U.S. Cl. ............................... 318/41; 318/49; 318/80; 318/82; 318/104; 388/825; 388/827
[58] Field of Search .................. 318/41–43, 318/46, 49, 66, 80, 82, 83, 101, 104, 111–113; 388/825, 826, 827, 828, 829

[56] References Cited

U.S. PATENT DOCUMENTS

| 404,567 | 7/1889 | Shallenberger | 318/42 X |
| 2,066,508 | 1/1937 | Young | 318/46 X |
| 3,519,909 | 7/1970 | Mathias et al. | 318/46 |
| 4,988,930 | 1/1991 | Oberheide | 318/82 |
| 5,134,351 | 7/1992 | Msihid | 318/541 |
| 5,165,249 | 11/1992 | Thompson | 318/112 X |

FOREIGN PATENT DOCUMENTS 0445015 9/1991 European Pat. Off. .
2381350 9/1978 France .
628828 10/1947 United Kingdom .
1554695 10/1979 United Kingdom .

*Primary Examiner*—William M. Shoop, Jr.
*Assistant Examiner*—Brian Sircus
*Attorney, Agent, or Firm*—Morgan & Finnegan

[57] ABSTRACT

A system, which may be a cooling system for a motor vehicle engine, has two direct current motors together with switching circuits which provide selective connection of the windings of the two motors to a direct current voltage source in such a way as to obtain different operating modes for each motor. One of the motors has four brushes, the first of which is permanently connected to the first polarity of the source, while its second, third and fourth brushes are arranged so that they can be connected to the appropriate source polarities respectively through either three interruptors or two. The second motor has two brushes permanently connected, respectively, to the same first source polarity and to the third or fourth brush of the first motor. According to the settings of the various interruptors, different operating modes for the motors are obtained, going from the mode in which both motors are stopped to one in which they are both running at their nominal speeds, through intermediate modes in which the speed of at least one of the motors is reduced.

10 Claims, 1 Drawing Sheet

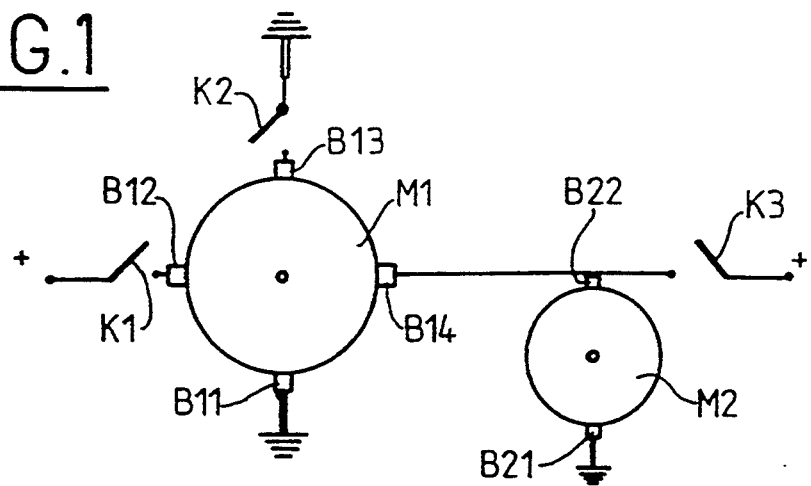
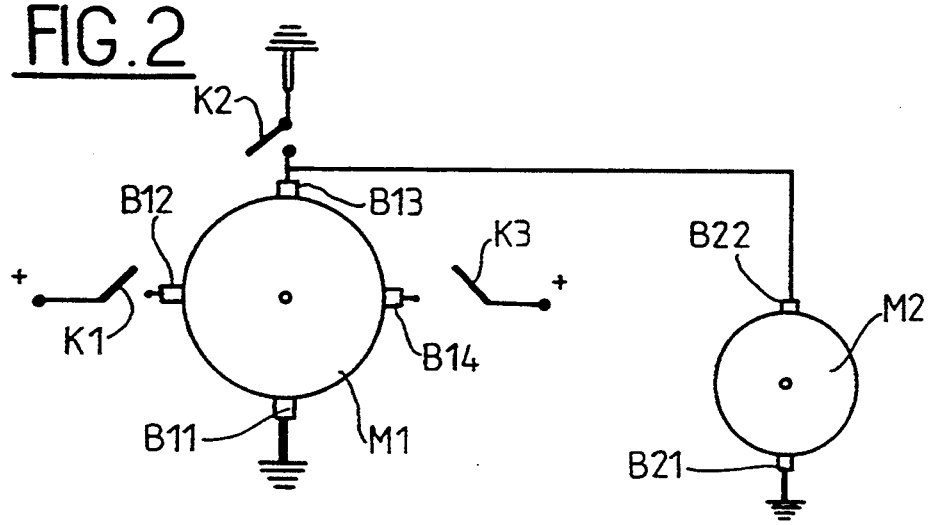
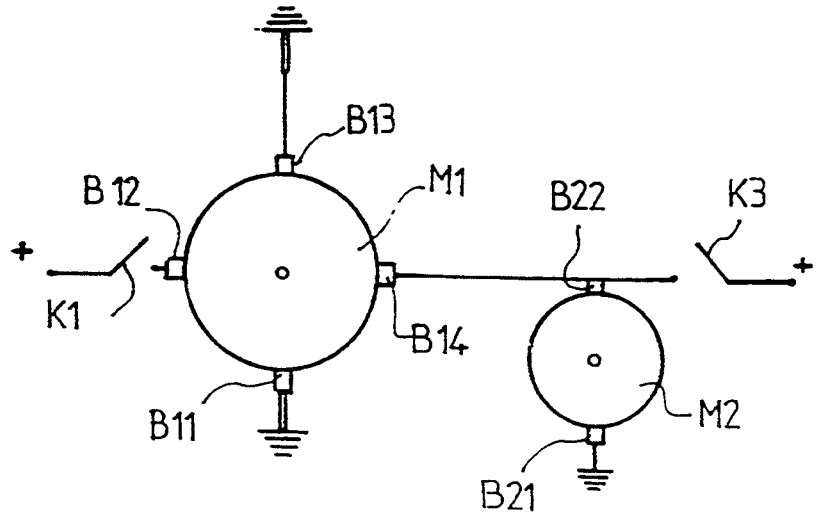

SWITCHING DEVICE FOR CONTROLLING TWO ELECTRIC MOTORS AT DIFFERENT SPEEDS

FIELD OF THE INVENTION

This invention relates to a system comprising apparatus which includes two direct current electric motors and switching means which are such as to connect the windings of the two motors selectively to a source of direct current, in such a way as to obtain different operating modes for each of the motors, including at least one mode of rotation at a speed which is lower than the nominal speed of the motor at the voltage of the said source.

BACKGROUND OF THE INVENTION

Electric motors are used in particular for driving fans in a cooling system for cooling heat engines of motor vehicles. It is often a requirement that these electric motors should have different operating modes as a function of the load on the heat engine and of weather conditions. These operating modes correspond to different levels of cooling, and comprise a mode in which the motor is stopped, a mode in which it runs at a nominal speed, and at least one intermediate speed mode.

The specification of French published patent application FR 2 658 962A describes a switching device which enables such different modes to be obtained for a fan motor having four brushes, by supplying these brushes directly at the voltage of the source, that is to say without making use of a resistance for reducing this source voltage. In addition, some cooling systems make use of two motorised fan units, both of which then have to be controlled in different modes.

U.S. Pat. specification No. 4 988 930 describes a system which includes two electric motors together with switching means which provide such control for the two motors. In that specification, a first one of the two motors has two independent windings, with one of these windings being arranged to be supplied by itself at the voltage of a source, by virtue of switching means, so as to run the motor at a high speed. The two windings of the motor can be supplied in series at this source voltage to give low speed working of the motor. The second motor has a single winding which is permanently connected in parallel with the first winding of the first motor, so as to be supplied at the source voltage or at a reduced voltage, so that this motor works at either high speed or low speed at the same time as the first motor. In the second operating mode of this type of known system, only one of the two series windings of the first motor is in parallel with the winding of the second motor, and this gives rise to a lack of equilibrium in the power supply to the first motor.

DISCUSSION OF THE INVENTION

One object of this invention is to overcome the above mentioned disadvantage.

A further object of the invention is to enable a motor having four brushes, of the type used in the system described in the above mentioned French specification FR 2 658 962A, to be used in a system having two motors.

According to the invention, a system comprising two direct current electric motors, together with switching means, the latter being adapted for connecting the windings of the two motors selectively to a source of uni-directional source voltage, in such a way as to obtain, for each motor, a plurality of different operating modes, among which is at least one mode of rotation at a speed which is lower than its nominal speed at the said source voltage, is characterised in that it includes: a first motor having four brushes, the nominal speed of the first motor being obtained by connecting a first said brush and a third said brush to a first polarity of the source, and a second said brush and a fourth said brush to the second polarity of the source, the first brush being permanently connected to the first polarity, while the second, third and fourth brushes are arranged so that they can be connected to the corresponding polarities of the source through the said switching means; and a second motor having two brushes, comprising a first brush which is permanently connected to the said first polarity, and a second brush which is connected to either the third brush or the fourth brush of the said first motor.

Further features of the invention, complementary or alternative to each other as appropriate, are set out (without limitation) below. Each of these features is an optional feature of the system according to the invention as defined above.

The said second brush of the second motor is connected to the fourth brush of the first motor.

The said switching means comprise a first interruptor, a second interruptor and a third interruptor, connected between the said second, third and fourth brushes of the first motor respectively, on the one hand, to the corresponding polarities of the source on the other.

The said switching means further include control means adapted to control the simultaneous opening of the three interruptors so as to cause the two motors to stop, and to cause at least the said first interruptor to close, so as to cause at least one of the motors to run.

The said control means are adapted to control the closing of at least one of the second and third interruptors at the same time as that of the said first interruptor.

The said control means are adapted to control the simultaneous closing of all three interruptors.

The said control means are adapted to control at least the closing of the said third interruptor independently of that of the said first interruptor.

The said switching means include first and second interruptors connected between the said second and fourth brushes of the first motor respectively, on the one hand, to the corresponding polarities of the source on the other.

The said switching means further include control means adapted to control the simultaneous opening of the two interruptors, so as to cause the two motors to stop and to obtain at least the closing of the first interruptor so as to cause at least one of the motors to run.

The system according to the invention is preferably a cooling system for cooling a heat engine of a motor vehicle, and further includes two fan rotors driven respectively by the two motors.

Further features and advantages of the invention will appear more clearly on a reading of the description of preferred embodiments of the invention which follows, and which is given by way of example only and with reference to the accompanying drawings.

BRIEF DESCRIPTION OF THE DRAWINGS

FIGS. 1 to 3 are electrical diagrams showing three preferred arrangements in accordance with the invention, with FIGS. 1 and 2 showing respectively two arrangements each having two motors and three interruptors, while FIG. 3 shows an arrangement with two motors and two interruptors.

DESCRIPTION OF PREFERRED EMBODIMENTS OF THE INVENTION

The two systems shown in FIGS. 1 and 2 comprise the same two direct current motors, namely a first motor M1 with four brushes, namely a first brush B11, a second brush B12, a third brush 813, and a fourth brush B14; together with a second motor M2 having two brushes, namely a fifth brush B21 and a sixth brush B22. The system also includes switching means in the form of three interruptors K1, K2, K3. The nominal speed of rotation of the motor M1 is obtained by connecting the brushes B11 and B13 to the negative polarity of a source of uni-directional voltage (a d.c. source), which is typically the battery of the vehicle. The brushes B12 and B14 are connected to the positive polarity of the d.c. source, and the slower speeds of rotation can be obtained by interrupting one of the connections between the motor concerned and at least one of the two polarities of the source.

The brush B11 is permanently connected to ground or earth on the vehicle, being itself connected to the negative polarity of the battery of the vehicle. The brushes B12, 813 and B14 may be connected respectively: to the positive terminal of the battery via the interruptor K1; to ground via the interruptor K2; and to the positive terminal of the battery via the interruptor K3. The brush B21 of the motor M2 is also permanently connected to ground, while the brush B22 is permanently connected to the brush B14 in FIG. 1 and to the brush B13 in FIG. 2.

In FIG. 1, the interruptors K1, K2 and K3 are shown as being open. Under these conditions, the two motors are disconnected from the positive pole of the battery and are therefore at rest. If the three interruptors are now closed, the four brushes of the motor M1 and the two brushes of the motor M2 are connected to the appropriate poles of the battery, so that both of the motors rotate at their nominal speed. If the motors are arranged to drive fans for cooling a heat engine, these fans then work at their maximum cooling capacity.

However, if only the interruptor K1 is closed, then only the brushes B11 and B12 of the motor M1 are connected to the negative and positive terminals of the battery, respectively. The motor M1 then runs at a reduced speed. In addition, the brush B14 is brought by induction to a positive potential which is smaller than that of the positive pole, which is transmitted to the brush B22 of the motor M2. Accordingly, the motor M2 also runs at a reduced speed.

If only the interruptor K3 is closed, the supply to the motor M1 is close to that in the last mentioned situation (i.e. with only the interruptor K1 closed), so that it runs at a reduced speed. By contrast, in the present case the motor M2 is supplied directly at the source voltage, and runs at its nominal speed.

If, as well as the interruptor K3, only one of the interruptors K1 or K2 is closed, the motor M1 then has three brushes connected to the source, and runs at a speed which is intermediate between the above mentioned reduced speed and the nominal speed. The motor M2 still runs at its nominal speed.

Finally, it is also possible to close only the interruptors K1 and K2, so as to cause the two motors to run at different reduced speeds from those in the examples given above.

According to the requirements as to cooling capacity, control means (not shown) may be provided for controlling all or part of the states of the interruptors described above.

Referring now to FIG. 2, the interruptors K1, K2 and K3 of this embodiment are again shown in the open state. Accordingly, neither motor is supplied with current, and both are at rest. The electrical connections of the motor M1 are the same as in FIG. 1; and its operating modes, which again depend on the settings of the interruptors, are the same. However, the motor M2 is here never supplied at the source voltage. When the interruptor K2 is closed, the brushes B21 and B22 are both connected to ground, and the motor M2 is at rest. When the interruptor K2 is open, with at least one of the interruptors K1 and K2 closed, the brush B3 is brought by induction to a positive potential which is smaller than that of the source, and the motor M2 rotates at a reduced speed.

Reference is now made to FIG. 3. In this Figure the arrangement is the same as that in FIG. 1, but without the interruptor K2. The brush B13 is thus always connected to the negative polarity of the voltage source. In the position shown in FIG. 3, in which the interruptors K1 and K3 are open, neither of the motors is supplied with current, and both are at rest. When the interruptor K1 is closed and the interruptor K3 is open, the two motors run at reduced speeds. When the two interruptors K1 and K3 are closed, the two motors run at their nominal speed, that is to say at a high speed. When the interruptor K1 is open and the interruptor K3 is closed, the motor M1 runs at a reduced speed (which it should be noted is different from that which is obtained in the case in which the interruptor K1 is closed with the interruptor K3 being open), while the motor M2 runs at its nominal speed, that is to say at a high speed.

The invention is not limited to the embodiments described above and shown in the drawings, and it will be understood that it extends to other versions. In particular, it can be arranged that the interruptors take the form of electro-mechanical means such as relays, or electronic means such as power transistors, which may for example be part of a module such as that normally referred to as a solid relay.

What is claimed is:

1. A system comprising: a first direct current electric motor having a first brush, a second brush, a third brush, and a fourth brush; a second direct current electric motor having a fifth brush and a sixth brush: a source of uni-directional voltage defining a first polarity and a second polarity; and switching means for selectively connecting the windings of the two motors to the said source in such a way as to obtain, for each motor, different operating modes which include at least one mode of rotation at a speed lower than a nominal speed of the motor at the source voltage; means permanently connecting the said first brush to the said first polarity; means permanently connecting the said fifth brush to the said first polarity; and means permanently connecting the said sixth brush to a brush of the first motor selected from the third and fourth brushes thereof, the said switching means comprising a plurality of interruptors connected variously between the motors and the source for connecting the said first and third brushes to the said first polarity and the second and fourth brushes to the second polarity, whereby to cause the first motor to run at its said nominal speed, and for connecting the said second, third and fourth brushes to the corresponding polarities of the source.

2. A system according to claim 1, wherein the said sixth brush and fourth brush are connected together.

3. A system according to claim 1, wherein the said switching means comprise first, second and third interruptors connecting the said second, third and fourth brushes respectively to the corresponding polarities of the source.

4. A system according to claim 3, wherein the said switching means further include control means for causing the said first, second and third interruptors to open simultaneously so as to stop both motors, and to cause at least the said first interruptor to close in order to start at least One of the said motors.

5. A system according to claim 4, wherein the said control means are arranged to control closing of at least one interruptor selected from the said second and third interruptors, at the same time as the opening of the said first interruptor.

6. A system according to claim 5, wherein the said control means are adapted to cause all three interruptors to close simultaneously.

7. A system according to claim 4, wherein the said control means are adapted to cause at least the third interruptor to close independently of the first interruptor.

8. A system according to claim 1, wherein the said switching means include a first interruptor and a second interruptor, for connecting the said second and fourth brushes respectively to the corresponding polarities of the source.

9. A system according to claim 8, wherein the said switching means further include control means adapted to cause the two said interruptors to open simultaneously so as to stop both motors, and to cause at least the said first interruptor to close in order to start at least one of the motors.

10. A system according to claim 1, further including two fan rotors driven respectively by the said first and second motors, the system being a cooling system for a motor vehicle heat engine.

* * * * *